United States Patent
Saari et al.

(10) Patent No.: US 6,532,035 B1
(45) Date of Patent: Mar. 11, 2003

(54) METHOD AND APPARATUS FOR IMPLEMENTATION OF CLOSE-UP IMAGING CAPABILITY IN A MOBILE IMAGING SYSTEM

(75) Inventors: Hannu Saari, Tampere (FI); Jarkko Rouvinen, Espoo (FI)

(73) Assignee: Nokia Mobile Phones Ltd., Tampere (FI)

( * ) Notice: Subject to any disclaimer, the term of this patent is extended or adjusted under 35 U.S.C. 154(b) by 32 days.

(21) Appl. No.: 09/608,345

(22) Filed: Jun. 29, 2000

(51) Int. Cl.[7] .................................................. H04N 7/14
(52) U.S. Cl. .............................. 348/14.02; 348/14.01; 396/429
(58) Field of Search ....................... 348/14.01, 14.02, 348/14.03, 14.04, 14.05, 14.06, 14.07, 340, 335, 344; 396/72, 429, 73; 250/201.3; 359/383, 721

(56) References Cited

U.S. PATENT DOCUMENTS 4,538,181 A * 8/1985 Taylor .......................... 358/208
6,177,950 B1 * 1/2001 Robb ......................... 348/14.02
6,339,508 B1 * 1/2002 Nozawa et al. ............. 396/429

FOREIGN PATENT DOCUMENTS

| DE | 19736675 A1 | * | 2/1999 | ............ H04N/7/14 |
| JP | 358057106 A | * | 4/1983 | ........... G02B/13/18 |
| JP | 410248030 A | * | 9/1998 | .......... H04N/5/225 |

* cited by examiner

Primary Examiner—Melur Ramakrishnaiah
(74) Attorney, Agent, or Firm—Ware, Fressola, Van Der Sluys & Adolphson LLP

(57) ABSTRACT

A method and apparatus for an imaging capable mobile terminal for close-up imaging is presented. An imaging lens arrangement has a first focal length in one direction and a second focal length in a second direction where the second focal length is shorter than the first focal length using an optical component such as a close-up lens or close-up lens and reflector which shortens the focal length of the lens arrangement. The close-up lens is mounted in a fixed position in the mobile terminal case and a rotatable camera assembly rotates a main camera lens into position behind the close-up lens so that the focal point of an object to be imaged can only converge at a point for close-up imaging.

17 Claims, 5 Drawing Sheets

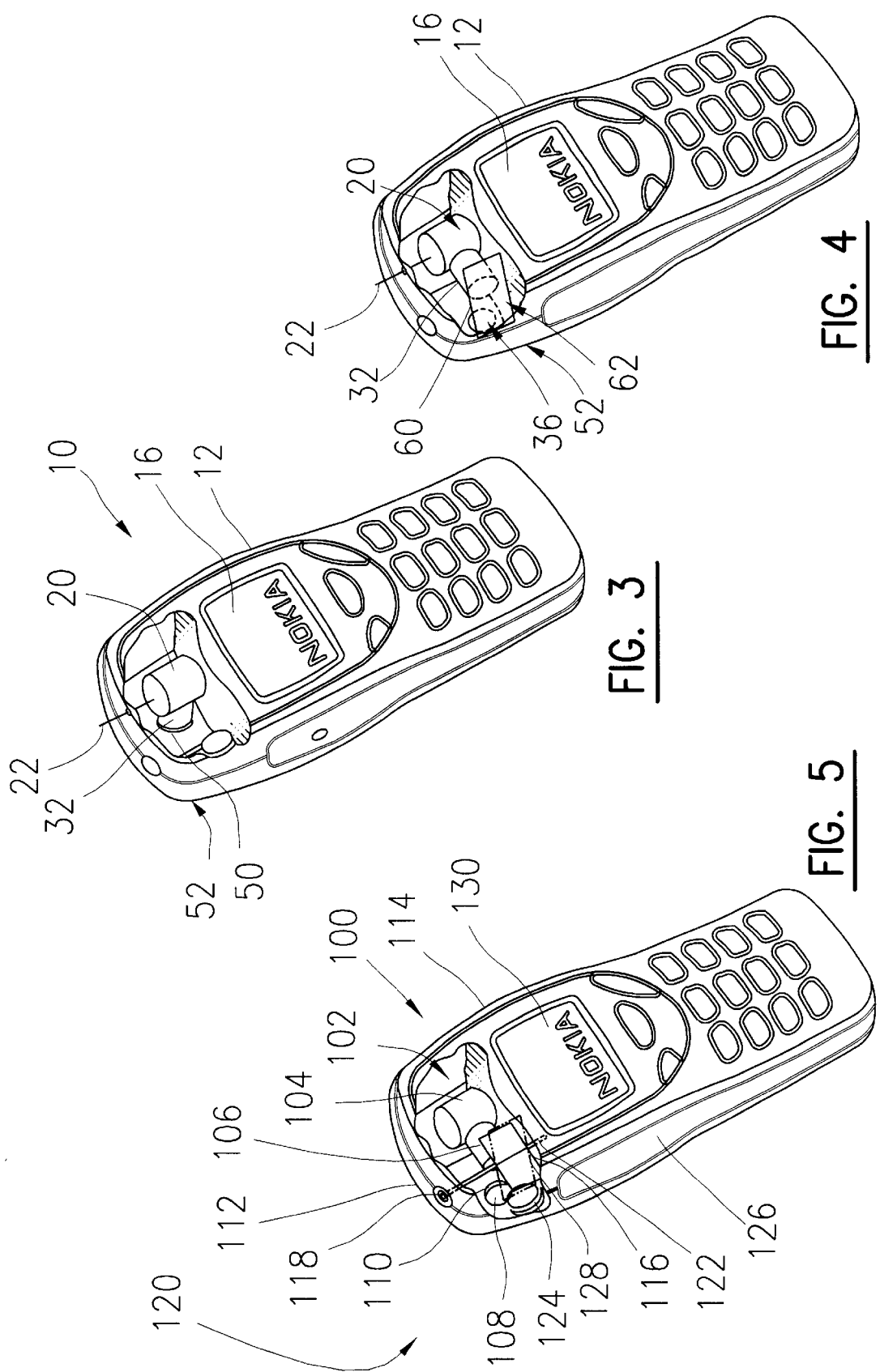

METHOD AND APPARATUS FOR IMPLEMENTATION OF CLOSE-UP IMAGING CAPABILITY IN A MOBILE IMAGING SYSTEM

FIELD OF THE INVENTION

The present invention relates generally to the field of mobile phones and deals more particularly with imaging capable mobile terminals and systems.

BACKGROUND OF THE INVENTION

A mobile communication terminal equipped with an electronic camera is a multipurpose device for capturing, transmitting and receiving still images, video and audio, and other possible forms of communication. The wide variety of possible uses and applications imposes a limiting and contradictory demand to the optical and mechanical properties of the camera. For example, when such a mobile communication terminal is used as a personal video telephone, the camera is expected to be on the same side of the terminal as the display so that the user can see the display while the camera is pointing at him/her. On the other hand, in a photography application, it is desirable and beneficial for the user to see the display while the camera is pointing in the same direction that the user is looking at. This contradiction in demands is partially solved by a swivel mechanism that allows the camera to rotate towards and away from the user as described, for example, in U.S. Pat. No. 5,612,732 issued Mar. 18, 1997 entitled "Portable Compact Imaging and Displaying Apparatus with Rotatable Camera." A rotatable camera head may also be necessary to accommodate a lens barrel that long compared to its diameter to provide a compact carrying position wherein the barrel folds into the body of the device case.

In some instances, a macro or close-up lens, is desired to enable imaging and image capture from very short object distances for example within a few millimeters. An example of such an application is the use of the camera as a scanner for capturing text, handwriting, numbers, bar codes or other applicable information. These types of applications call for short object distances and if the object distance is relatively long, for example, 20 to 30 centimeters, the object is rendered very small on the focal plane making further processing such as object separation and recognition much more difficult as the spatial resolution is decreased and the desired object is further surrounded by unwanted objects. If the magnification of the optical system is increased, the angle or view of the camera becomes very small making it extremely difficult to hold the camera accurately positioned and aimed at the object image to be captured.

One possible solution to accommodate close-up and non close-up imaging requirements is to provide a camera with a swiveled close-up lens. However, the requirement of an additional close-up lens may result in a fragile or unnecessarily complex mechanical structure because the mechanism for turning the close-up lens in front of the main lens assembly must move or rotate together with the camera to accommodate the requirements of the different orientations of the communication terminal as described above.

Applicants are not aware of the existence of mobile phones with close-up shooting capable cameras. Some personal digital assistant (PDA) devices, for example, Sharp Zaurus, feature a close-up imaging mode. However, the shortest object distance is still relatively long, about 10 to 15 centimeters. In the case of PDA devices, the close-up mode is implemented by ordinary zoom optics and not with an external close-up lens. A similar structure, i.e., zoom optics, is used in some conventional cameras and digital still cameras, however, such implementation does not allow object distances short enough for optical character recognition (OCR) use with the difference between a close-up imaging mode and an OCR imaging mode being about a ten-fold difference.

Separate close-up lenses can be found in system cameras, broadcast television cameras, and so forth as an add-on accessory. These accessory close-up lenses typically enable very short object distances compared to the focal lens of the main optics, but a detachable close-up lens is not a viable option in mobile phones.

It is an object therefore of the present invention to provide an economical implementation of a close-up imaging capability in a mobile phone equipped with a camera.

It is a further object of the present invention to provide a close-up lens in a mobile phone for text recognition by means of optical character recognition (OCR) techniques.

It is a further object of the present invention to provide a mobile phone with a close-up lens for photographing very small objects to enhance the versatility of the mobile phone.

SUMMARY OF THE INVENTION

According to a broad aspect of the present invention, an imaging capable mobile terminal comprises an imaging lens arrangement having a first focal length in one direction and a second focal length in another direction wherein the second focal length is shorter than the first focal length with the aid of an optical component which shortens the focal length of the lens arrangement.

According to a further aspect of the imaging capable mobile terminal of the present invention, the optical component of the lens arrangement comprises a close-up lens.

In another aspect of the imaging capable mobile terminal of the present invention, the optical component of the lens arrangement comprises a close-up lens and a reflector for folding the optical path length of the lens arrangement.

In a yet further aspect of the imaging capable mobile terminal of the present invention, the optical component of the lens arrangement comprises a concave reflector placed in front of the lens arrangement to intercept the optical path length of the lens arrangement.

In a still further aspect of the imaging capable mobile terminal of the present invention, the imaging lens arrangement further comprises a camera lens wherein one of the camera lenses or the optical component is held in a fixed position and the other camera lens or optical component is arranged for movement relative to one another to shorten the focal length of the lens arrangement.

In accordance with another aspect of the present invention, a lens system capable of close-up imaging for use in a mobile terminal comprises in order from an object side, an optical component which shortens the focal length, an imaging lens arrangement wherein the optical component is fixedly held in a wall portion of the mobile terminal, and a main camera lens carried by a rotatable camera assembly whereby the camera assembly is rotated into position behind the optical component for close-up imaging.

In accordance with a further aspect of the present invention, a method for close-up imaging in an imaging capable mobile terminal comprises the steps of providing an imaging lens arrangement having a first focal length in one direction and a second focal length in another direction, providing an optical component, and shortening the focal length of the lens arrangement with the aid of the optical component whereby the second focal length is shorter than the first focal length for close-up imaging.

BRIEF DESCRIPTION OF THE DRAWINGS

Additional objects, features, and advantages of the present invention will become readily apparent from the following written description and the accompanying drawings where:

FIG. 3 shows the mobile phone of FIG. 1 with the camera rotated to the photography position;

FIG. 4 shows another embodiment of the present invention with the camera rotated to the close-up position wherein a flat reflector folds the optical path passing through a close-up lens mounted in the back wall of the mobile phone;

FIG. 5 shows a further embodiment of the present invention wherein the camera assembly is fixed and an optical component is rotated into and out of the optical path to select the direction of imaging;

DETAILED DESCRIPTION OF PREFERRED EMBODIMENTS

Figure 1:
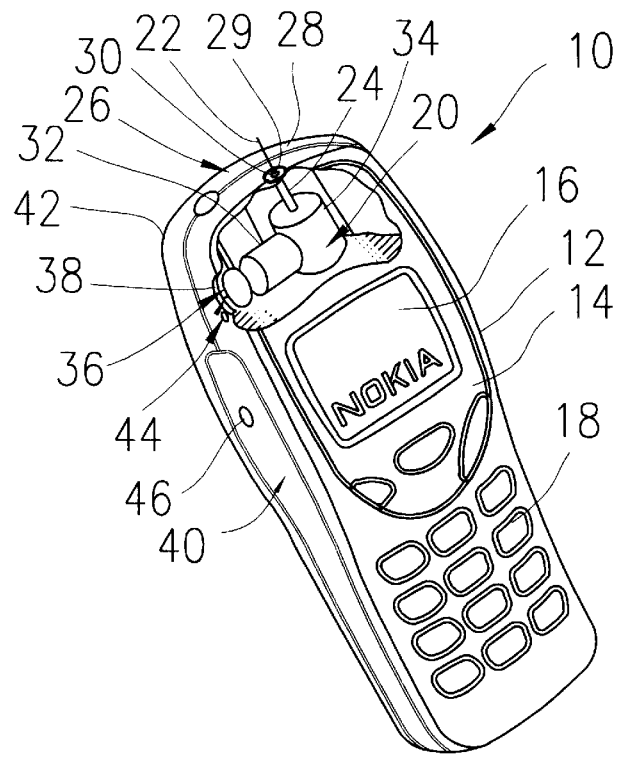
FIG. 1 is a partially cut away view of a mobile phone showing one embodiment of the invention with the camera rotated to the close-up position behind a close-up lens mounted in the sidewall of the mobile phone case for close-up imaging.

Turning now to the drawings and considering the invention in further detail, FIGS. 1–5 show a mobile communication terminal or mobile phone of the type that may be practiced with the present invention. The mobile communication terminal shown in FIG. 1 is generally designated 10 and although specifically described with respect to FIG. 1, the mobile communication terminals of FIGS. 2–5 operate in a substantially similar manner and therefore like parts and components are referred to with like designation and reference numerals. The mobile communication terminal 10 of FIG. 1 includes a case or housing 12 having a forward facing section 14 which includes a LCD or other similar electronic screen 16 well known to people skilled in the display art for showing text, characters or graphics. The forward facing section 14 also includes a multifunctional keypad generally designated 18 which provides a means for entering alphanumeric characters associated with for example, dialing a telephone number, entering text messages, accessing an instruction menu and other functional operations generally associated with mobile communications. Such other functional operations may include PDA functions, telephone book or other memo storage means, calculator functions and the like and may be used for sending and receiving messages or information from a global computer network or local switched network.

The keypad 18 of the present invention also includes means such as a mode selection key to select the camera operating mode of the mobile communication terminal. The specific operating mode of the camera, that is, scanning, OCR, photography, conferencing and other scanning modes may be selectable from a menu which is displayed on the screen 16 or by operation of a combination of keys on the keypad 18. The menu alternately may be audio interactive or audio responsive.

The housing 12 which may be of a molded plastic or other such similar composition is shown partially cut away to reveal the rotatable camera assembly generally designated 20. The camera assembly 20 includes a camera body 34 which is arranged for rotating about a pivot axis 22 which extends generally axially lengthwise of the mobile communication terminal 10 and through the camera body. The camera assembly 20 includes an axially elongated shaft or other connecting means 24 extending generally along the axis 22 from the top of the camera body 34 to the upper portion 26 of the case 12. The shaft 24 terminates generally coplanar with the surface 28 of the upper portion 26 of the communication terminal 10. The shaft 24 has an exposed end section 30 accessible to the user and may be a knurled knob or other gripping means 29 to rotate the camera assembly 20 to the desired position as described hereinbelow. Although a manual rotation means is shown, an electrically operated micromotor coupled to the camera assembly 20 can also be used to rotate the camera assembly to the desired imaging position.

The camera assembly 20 includes a main camera lens comprising an image capturing means and lens portion 32 carried by the camera body 34. The lens portion 32 extends from the camera body 34 substantially longitudinally and perpendicularly to the body 34 and the axis 22.

A close-up lens generally designated 36 is fixedly attached or mounted within a recess 38 in the sidewall 40 of the case 12. Integration of the close-up lens 36 and the case 12 overcomes and avoids problems associated with typical movable close-up lens mechanisms and structures as described above. With the present invention, the close-up lens 36 forms an integral part of the case 12 and placement can be precisely controlled and replicated from case to case during manufacture. Precise manufacturing control allows the placement of the close-up lens 36 which may be an optical grade plastic or the like to be at the correct focus distance from the edge or surface 42 of the side 40 of the communication terminal 10. Additionally, mounting the close-up lens 36 within the recess 38 protects the surface of the close-up lens from being scratched or otherwise damaged. The close-up lens can be made of similar transparent plastic as are other parts of the mobile terminal to reduce costs of manufacture and materials.

The present invention avoids the necessity that the user hold the communication terminal 10 at a precise distance from the object to be imaged but simply to lay the side 40 in the area of the close-up lens on the object surface for example, on the page surface of the text being scanned. Integrating the close-up lens 36 in the sidewall 40 of the case 12 causes the optical axes of the camera assembly 20 and the close-up lens 36 to converge in only one possible position of the camera assembly. Thus, the camera assembly 20 needs only to rotate the lens 32 into cooperating position with the close-up lens 36 which substantially reduces the complexity of the mechanical design of the lens and camera assembly.

Optionally, an illuminating element such as a light emitting diode (LED) generally designated 44 can be placed adjacent to the close-up lens 36 to illuminate the object being imaged. Generally, there is no need for additional illumination from the light emitting diode 44 as existing light sources such as from the screen 16 or the keypad 18 can be used to illuminate the object being scanned. Further, the mobile communication terminal 10 may optionally include an infrared communication port or transmitter 46 for transferring information to and from the mobile communication terminal 10 and which infrared port may also direct illumination to the object being scanned. Other methods for illuminating the object being scanned include other optical components such as light guides, light conducting fibers, sidewall illumination and other illuminating methods and structures generally known to those in the art of illumination in portable devices.

Figure 2:
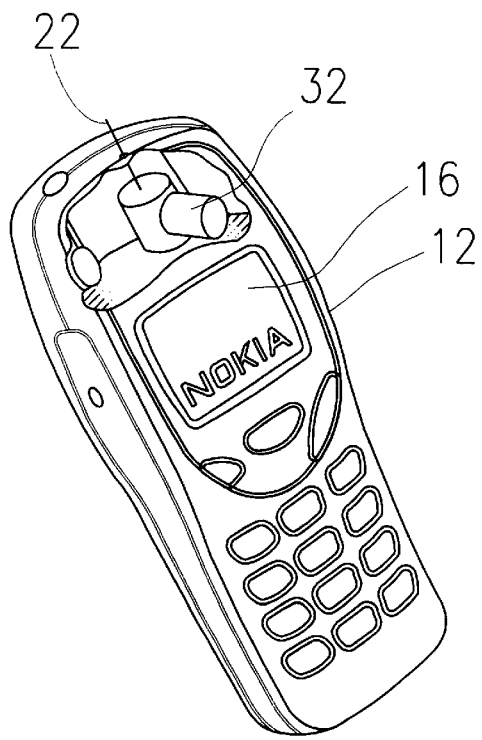
FIG. 2 shows the mobile phone of FIG. 1 with the camera rotated to the video conferencing position.

FIG. 2 illustrates the mobile communication terminal 10 of FIG. 1 with the camera assembly 20 rotated to the video conferencing position so that the lens 32 captures the image of the user as the user holds the communication terminal. The captured image can be displayed on the screen 16 of the communication terminal of another user and normal voice or audio communications are sent and received in a standard manner.

FIG. 3 shows the mobile communication terminal 10 of FIG. 1 with the camera assembly 20 rotated so the lens 32 is in the photography position. The terminal is held so it can be aimed at an object to be photographed which is sited through an aperture or opening 50 in the rear wall surface 52 of the case 12. In the photography mode of operation, the user holds and aims the back of the communication terminal 10 in the desired direction and the image to be captured is displayed on the screen 16. The image can be captured electronically and stored for subsequent download and/or transmission or may be simultaneously transmitted to another terminal or mobile communication device of another user.

FIG. 4 illustrates a further embodiment of the present invention wherein the close-up lens 36 is mounted in a recess 60 in the rear surface wall 52 of the body 12. In this embodiment, an additional optical component or other optical means such as a flat mirror reflector or concave reflector 62 make up a lens assembly which is positioned to fold and shorten the focal length of the lens assembly. This arrangement allows the close-up or magnification capability of the present invention to magnify the image being viewed through the close-up lens 36 to be displayed and viewed by the user on the screen 16.

Turning now to FIG. 5, a further embodiment of the mobile communication terminal embodying the present invention is shown therein and generally designated 100. The mobile communication terminal 100 is substantially similar to the mobile phones illustrated in FIGS. 1–4. However, the camera assembly generally designated 102 is fixed, that is, the camera assembly 102 does not rotate in the mobile phone. The camera assembly 102 is substantially identical to the camera assembly 20 described above in all other aspects and includes a camera body 104 and a main camera lens comprising the image capturing means and lens portion 106 carried by the camera body 104. The lens portion 106 extends from the camera body 104 substantially longitudinally and perpendicularly to the lengthwise axis of the camera body 104.

A close-up lens generally designated 108 is fixedly attached or mounted within a recess 110 in the rearwall 112 of the mobile phone case 114. An optical component such as a flat mirror reflector generally designated 116 is arranged and mounted for pivotal movement about a pivot 118 located in the upperwall portion 120 of the mobile communication terminal 100 and an oppositely disposed pivot 122 located within the mobile communication terminal 100. The flat mirror reflector 116 is shown in the photography operating mode position to permit an object or image to be captured to be in alignment with the camera lens 106 through an aperture 124 and the sidewall 126 of the case 114. The flat mirror reflector 116 is selectively pivoted to intercept the optical path as illustrated by the phantom dashed lines 128 to direct an optical path passing through the close-up lens 108 to be folded or bent to direct the path to the camera lens 106.

In alternate embodiments, the optical component such as the flat mirror reflector 116 may be slid into and out of position to intercept the optical path to direct an optical path passing through the close-up lens 108 to be folded or bent to direct the path to the camera lens 106.

The optical component such as the flat mirror reflector 116 may also be hinged along one vertical edge and arranged and mounted to be selectively folded about the hinged axis to intercept the optical path to direct an optical path passing through the close-up lens 108 to be folded or bent to direct the path to the camera lens 106.

As also indicated above, an image to be scanned or captured can be displayed on the screen 130 of the mobile communication terminal 100. Also, the flat mirror reflector 116 can be manually rotated into and out of the optical path or other means such as a micromotor can be also utilized to rotate the flat mirror reflector.

The position for mounting the close-up lens 36 can be selected in any instance to best accommodate the requirements of the size, cost and intended uses of the mobile communication terminal and is not restricted to the exemplary embodiments. There are substantially an unlimited number of different designs for such communication terminals to accommodate various requirements. For example, if the camera rotates so that the close-up imaging position is towards the top or towards the bottom of the mobile phone, the user can hold the mobile phone in a similar manner as holding a writing instrument such as a pen or pencil. This natural holding position of the mobile phone allows easy scanning of text or other graphics. The basis for the positioning of a close-up lens and a camera assembly are illustrated schematically in several examples in FIGS. 6–10 which show various accommodations of a lens and the focal length to an object to be imaged.

Figure 6:
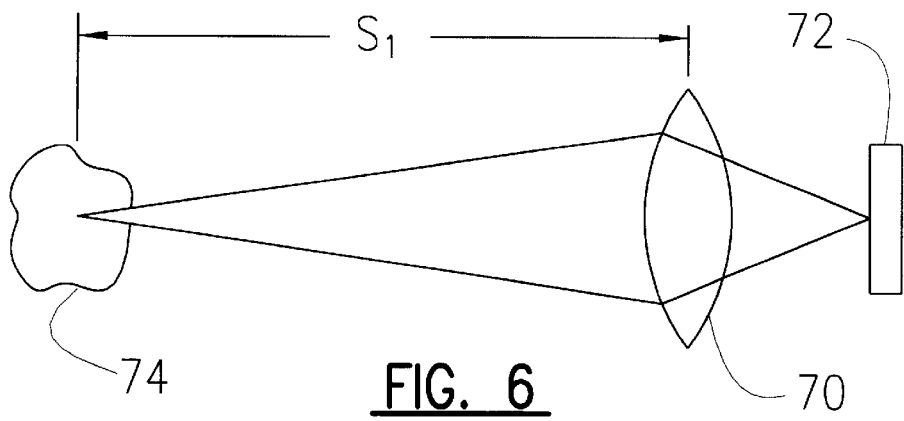
FIG. 6 shows an optical path produced with a single lens arrangement.

FIG. 6 illustrates a lens 70 and an image capturing means 72 wherein the object 74 to be captured is at a focus length S1 from the lens to cause the image 74 to converge at the image capturing means 72.

Figure 7:
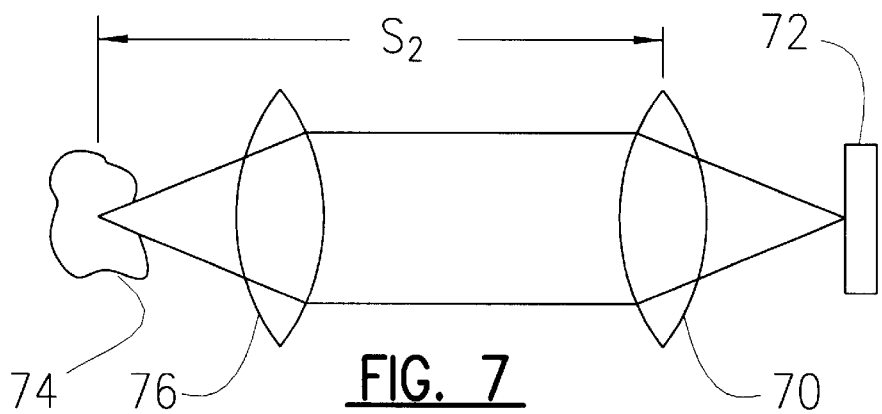
FIG. 7 shows an optical path produced with a lens arrangement to provide a shorter optical path.

In FIG. 7, a positive lens 76 is added to the optical path between the lens 70 and the object 74 to shorten the focal length to provide close-up imaging. As illustrated in FIG. 6, the focal length S2 is reduced to compress the optical path for close-up imaging.

Figure 8:
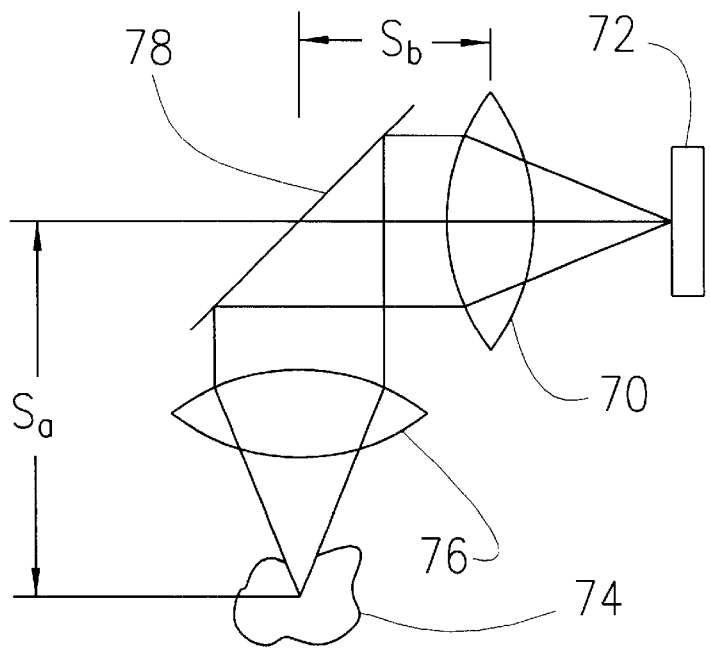
FIG. 8 shows a folded optical path produced with an alternate lens arrangement to provide a shorter optical path.

A further arrangement for shortening the optical path is illustrated in FIG. 8 and includes an optical component or element such as a flat reflector 78 to bend the optical path from the object 74 to the image capturing means 72. The focal length of the positive lens 76 from the object 74 to the flat mirror reflector 78 is designated $S_a$ and the focal length from the flat reflector 78 to the lens 70 is designated $S_b$ wherein the sum of $S_a$ plus $S_b$ is equal to the focal length $S_2$ of FIG. 7. Thus, it can be seen by bending or folding the optical path, the mechanical and physical arrangement of the lens assembly can be made to accommodate various physical and mechanical constraints of the mobile communication terminal.

Figure 9:
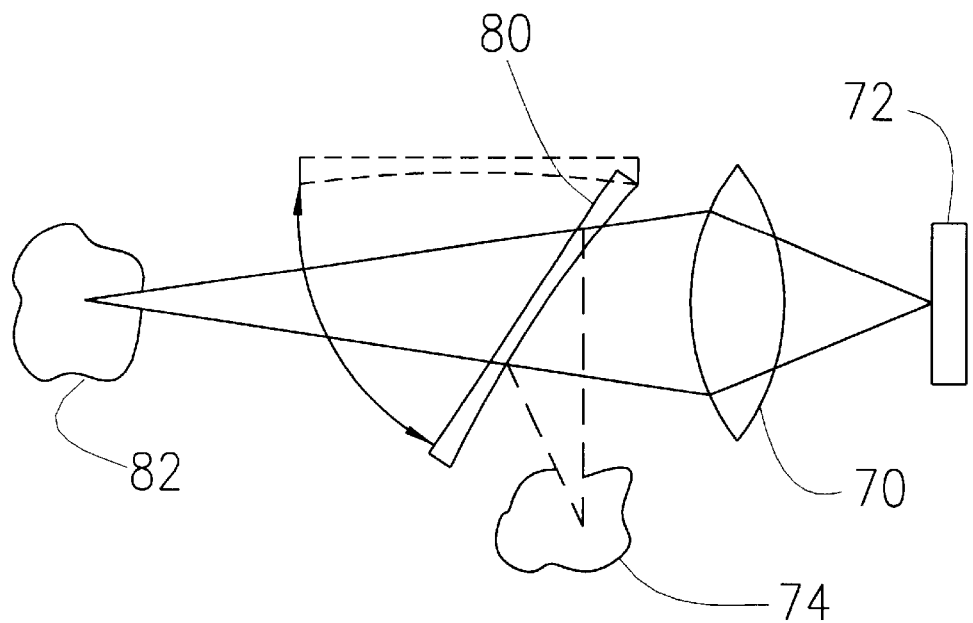
FIG. 9 shows an alternate method to produce a folded optical path in the present invention wherein a concave reflector is rotated into the optical path to produce a shorter focal distance for close-up imaging.

An alternate arrangement is illustrated in FIG. 9 wherein an optical component such as a concave mirror 80 pivots or rotates into the optical path to bend or fold the optical path so that the image 74 converges at the image capturing means 72 as a close-up image. In a non-close-up mode, the concave mirror 80 is rotated out of the optical path and the image 82 converges at the image capturing means 72 in a similar manner as illustrated in FIG. 6.

Figure 10:
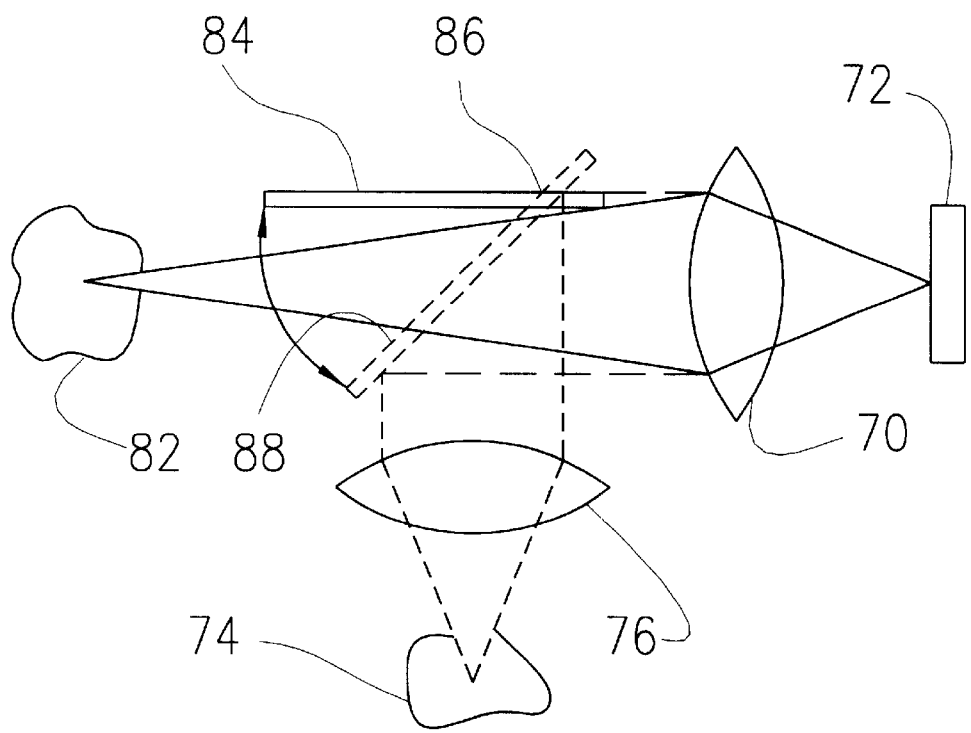
FIG. 10 shows schematically another alternate method to produce a folded optical path in the present invention wherein a flat reflector pivots to direct the optical path through the close-up lens.

A yet further arrangement for shortening and selecting the direction of imaging is illustrated somewhat schematically in FIG. 10 wherein an optical component such as a flat mirror reflector 84 is arranged for pivotal movement about a pivot 86. As shown in FIG. 10, in a non-close-up mode the image 82 converges at the image capturing means 72 in a similar manner as illustrated in FIG. 6. In the close-up mode, the flat mirror reflector is pivoted to fold or bend the optical path as illustrated by the dash line position 88 so that the direction of imaging is through the close-up lens 76 wherein the image 74 converges at the image capturing means 72 in a similar manner as described in connection with FIG. 8. In both FIGS. 9 and 10, the image capturing means 72 and the lens 70 are fixed relative to the additional optical components which shorten the optical path.

Figure 11:
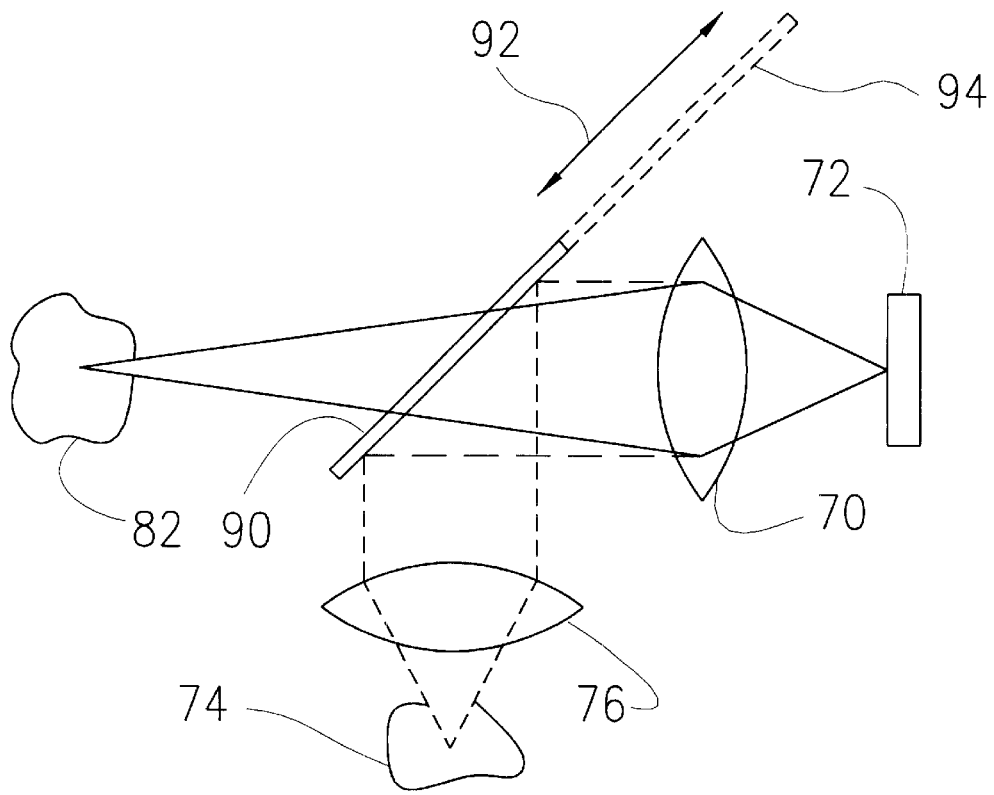
FIG. 11 shows schematically a further alternate method to produce a folded optical path wherein the optical component slides along a rectilinear path to direct the optical path through the close-up lens.
Figure 12:
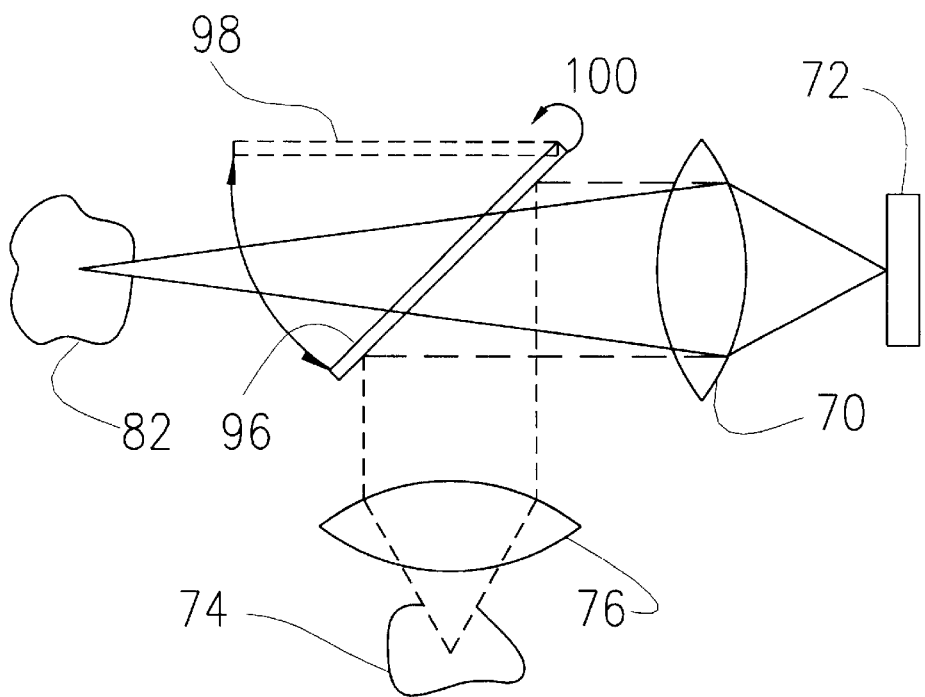
FIG. 12 shows schematically a further alternate method to produce a folded optical path wherein the optical component is hinged to direct the optical path through the close-up lens.

Further arrangements for shortening and selecting the direction of imaging are illustrated somewhat schematically in FIGS. 11 and 12. In FIG. 11, an optical component such as a flat mirror reflector 90 is arranged for sliding movement along a rectilinear path indicated by the arrow 92. As shown in FIG. 11, in a non-close-up mode the reflector 90 is in the dash line position 94 and the image 82 converges at the image capturing means 72 in a similar manner as illustrated in FIG. 6. In the close-up mode, the reflector 90 is slid into the optical path so that the direction of imaging is through the close-up lens 76 wherein the image 74 converges at the image capturing means 72. In FIG. 12, the flat mirror reflector 96 is hinged for rotation about the hinge axis 100. In the non-close-up mode, the reflector is rotated about the hinge axis 100 to the dash line position 98 and the image 82 converges at the image capturing means 72 in a similar manner as shown in FIG. 6. In the close-up mode, the reflector 96 is rotated into the optical path and the direction of imaging is through the close-up lens 76.

It can be seen that there are numerous variations of the structure and apparatus of the present invention that may be implemented without departing from the spirit and scope of the invention. Therefore, the present invention has been described by means of illustration rather than limitation.

What is claimed is:

1. An imaging capable mobile terminal comprising:
   an imaging lens arrangement fixedly disposed in the mobile terminal, wherein the image lens arrangement has a focal length along a first optical path in a first direction, and wherein the focal length in the first direction is equal to a first value;
   a first optical component, disposed in the optical path, for intercepting and changing at least part of the first optical path to a second optical path in a second direction different from the first direction; and
   a second optical component, disposal in the second optical path, for changing the focal length of the image lens arrangement such that the focal length of the image lens arrangement in the second direction is equal to a second value different from the first value, said second optical component further comprising a close-up lens recessed from the surface in a wall of the terminal at a predetermined precise distance from said wall surface to provide the correct focus distance between an object surface carrying an object to be imaged and said wall surface in contact with the object surface for close-up imaging.

2. An imaging capable mobile terminal as set forth in claim 1, wherein said first optical component comprises a reflector for folding the optical path length of the lens arrangement.

3. An imaging capable mobile terminal as set forth in claim 1, wherein said close-up lens is an optical grade plastic.

4. An imaging capable mobile terminal as set forth in claim 1, wherein said first optical component comprises a concave reflector placed in front of the lens arrangement to intercept the optical path length of the lens arrangement.

5. An imaging capable mobile terminal as set forth in claim 1, wherein said imaging lens arrangement further comprises a camera lens.

6. An imaging capable mobile terminal as set forth in claim 5, wherein said camera lens is held in a fixed position and said first optical component is arranged for movement relative to said camera lens to shorten the focal length of the lens arrangement.

7. An imaging capable mobile terminal as set forth in claim 1, further including a viewfinder for aiming said lens arrangement at an object to be imaged.

8. An imaging capable mobile terminal as set forth in claim 1, further including an illuminating element adjacent said close-up lens for illuminating the object to be imaged carried on the object surface.

9. Method for close-up imaging in an imaging capable mobile terminal comprising the steps of:
   providing an imaging lens arrangement fixedly disposed in the mobile terminal, wherein the image lens arrangement has a focal length along a first optical path in a first direction, and wherein the focal length in the first direction is equal to a first value;
   providing a first optical component, disposed in the optical path, for changing at least part of the first optical path to a second optical path in a second direction different from the first direction; and
   providing a second optical component, disposed in the second optical path, for changing the focal length of the image lens arrangement such that the focal length of the image lens arrangement in the second direction is equal to a second value different from the first value, wherein the step of providing said second optical component further includes providing a close-up lens recessed from the surface in a wall of the terminal a predetermined precise distance from the wall surface to provide the correct focus distance between an object surface carrying an object to be imaged and the wall surface in contact with the object surface for close-up imaging.

10. Method for close-up imaging in an imaging capable mobile terminal as defined in claim 9, wherein the step of providing said first optical component further comprises providing a reflector for folding the optical path length of the lens arrangement.

11. Method for close-up imaging in an imaging capable mobile terminal as defined in claim 9, wherein the step of providing a reflector further comprises placing a concave reflector in front of the lens arrangement for intercepting the optical path length of the lens arrangement.

12. Method for close-up imaging in an imaging capable mobile terminal as defined in claim 9, wherein the step of providing said first optical component further comprises hinging said first optical component for intercepting the optical path length of the lens arrangement.

13. Method for close-up imaging in an imaging capable mobile terminal as defined in claim 9, wherein the step of providing said first optical component further comprises sliding said first optical component for intercepting the optical path length of the lens arrangement.

14. Imaging capable mobile terminal comprising:
   an imaging lens arrangement having a first focal length along a first optical path and a second focal length along a second optical path;
   an optical component;
   an optical grade plastic close-up lens integral in a wall of the imaging capable mobile terminal and located along one of said first and second optical paths, said close-up lens being recessed a predetermined precise distance from an outer surface of the imaging capable mobile terminal to provide the correct focus distance from the outer surface for close-up imaging;
   a camera lens assembly fixedly mounted in the image capable mobile terminal and located along the other of said first and second optical paths; and
   means for folding said one of said first and second optical paths with the aid of said optical component to direct said one of said first and second optical paths to said camera lens assembly for close-up imaging.

15. Imaging capable mobile terminal as defined in claim 14, wherein said means for folding further comprises a reflector for folding the optical path length of the lens arrangement.

16. Imaging capable mobile terminal as defined in claim 15, wherein said reflector further comprises a concave reflector.

17. Method for close-up imaging in an imaging capable mobile terminal comprising the steps of:
   providing an imaging lens arrangement having a first focal length along a first optical path and a second focal length along a second optical path;
   providing an optical component;
   locating an optical grade plastic close-up lens along said second optical path;
   mounting the optical grade plastic close-up lens integral in a wall and recessed a predetermined precise distance from an outer surface of the imaging capable mobile terminal to provide the correct focus distance from the outer surface for close-up imaging;
   locating a camera lens assembly along said first optical path;
   fixedly mounting the camera lens assembly in the image capable mobile terminal; and
   folding said second optical path with the aid of the optical component to direct said second optical path to said camera lens assembly for close-up imaging.

* * * * *

UNITED STATES PATENT AND TRADEMARK OFFICE
CERTIFICATE OF CORRECTION

PATENT NO. : 6,532,035 B1
DATED : March 11, 2003
INVENTOR(S) : Saari et al.

It is certified that error appears in the above-identified patent and that said Letters Patent is hereby corrected as shown below:

Title page,
Item [56], References Cited, U.S. PATENT DOCUMENTS, the following references should be added:
-- 5,612,732    3/1997   Yuyama et al.
   5,623,371    4/1997   Hankawa
   6,002,533    12/1999 Yoneyama --

Signed and Sealed this

Twenty-sixth Day of August, 2003

JAMES E. ROGAN
*Director of the United States Patent and Trademark Office*